Jan. 30, 1962     N. C. HUSTED     3,019,282
MID-SPAN SERVICE TAKE OFF
Filed Sept. 9, 1959
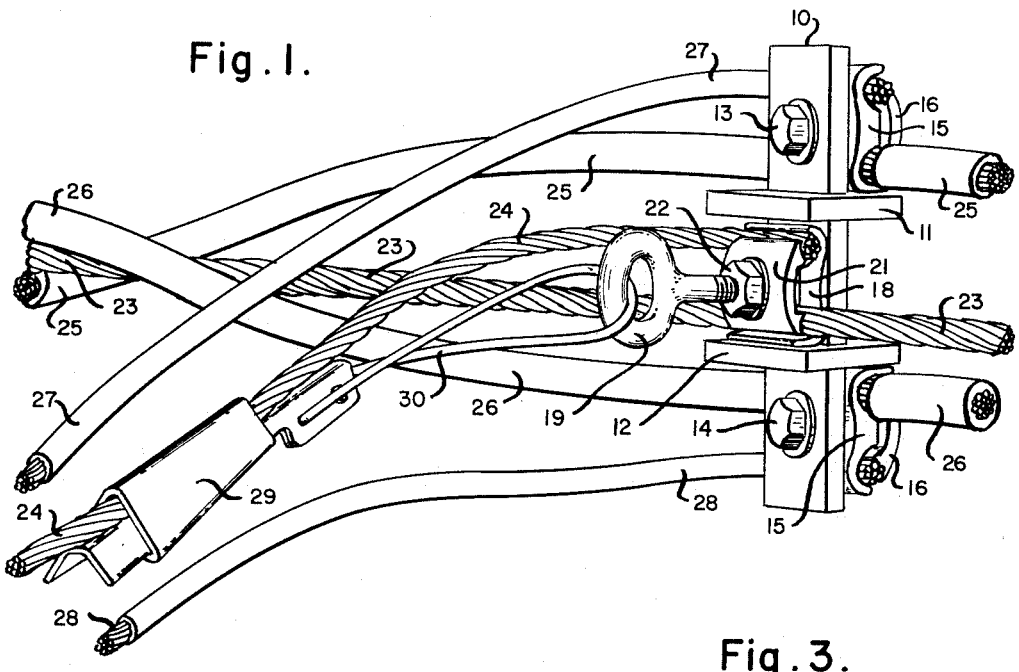
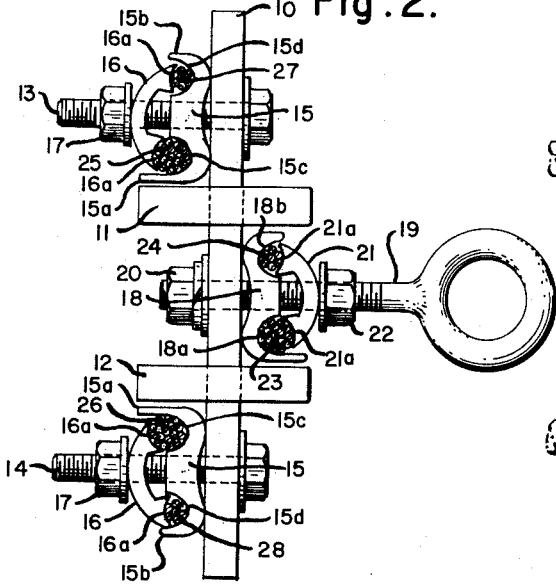
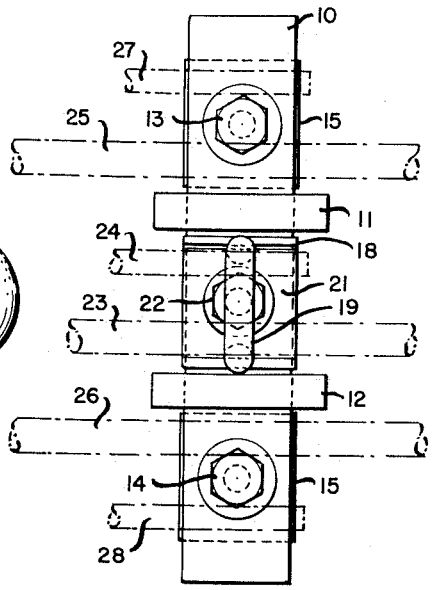
INVENTOR
Norris C. Husted

3,019,282
MID-SPAN SERVICE TAKE OFF
Norris C. Husted, Richland Township, Allegheny County, Pa. (R.D. 1, Gibsonia, Pa.)
Filed Sept. 9, 1959, Ser. No. 838,914
3 Claims. (Cl. 174—43)

This invention relates to mid-span service take off fixtures and, particularly, to an insulated baffled span service take off fixture for triplex or parallel wire spans.

There has long been a need for a fixture adapted to permanently separate and space a series of bunched, parallel or twisted main line wires and provide means so that branch circuit wires can be taken from the mains at any point in a span free from strain on the electrical connectors. Prior to the present invention the general and common practice in taking off branched circuits was to run the branched circuits from the nearest pole to the service outlet so that the pole could be used as the anchoring member to free the electrical connections from strain. This practice is represented by Ruggieri Patent No. 2,281,515. It has been proposed to connect branched circuits directly to the mains by conventional connectors but this practice places the strain of the branched circuit directly on the connector.

The present invention provides a fixture which safely permits mid-span service take off of branch circuits with permanent separating and spacing of the wire mains no matter what form they may take and with freedom from electrical interference one with the other and freedom from strain on the electrical connectors.

I provide a fixture having preferably an elongated dielectric spacing member, spaced conductive clamp means on the spacing member each adapted to conductively connect a main circuit and a branch circuit, a dielectric baffle between each pair of such clamp means transverse to the spacing member and extending outwardly from the spacing member and anchor means adapted to connect to the branch wires to receive the strain of the branch conductors whereby the clamps are free of strain. Preferably, the spacing member is a flat elongated dielectric member having spaced transverse quadrangular dielectric baffles equally spaced along its length transverse to its length. The anchor means is preferably an eyebolt forming a part of the clamp adjacent the center of the spacing member and fixed to said spacing member.

In the foregoing general description, I have set out certain objects, purposes and advantages of my invention. Other objects, purposes and advantages will be apparent from a consideration of the following description and the accompanying drawings in which—

FIGURE 1 is a perspective view of a preferred form of mid-span service take off according to my invention used with triplex wire and a three wire branch circuit;

FIGURE 2 is a side elevation of the mid-span take off fixture of FIGURE 1; and

FIGURE 3 is a front elevation of the mid-span take off fixture of FIGURE 1.

Referring to the drawings, I have illustrated a mid-span take off fixture having a spacing member 10 in the form of a flat elongated member of "Permali" (a laminated material made from selected thin Beechwood veneers impregnated under vacuum with synthetic resin and made dense by application of heat and pressure). A pair of rectangular baffles 11 and 12 are fixed about the spacing member at equal spaced intervals intermediate its ends. Centrally spaced bolts 13 and 14 extend through holes in the spacing member between each end and the adjacent baffle. E-shaped clamp bases 15 are threaded onto each such bolt into tight contact with the spacing member. Preferably, one leg 15a of each clamp base 15 is elongated more than the other leg 15b. The elongated leg 15a is placed adjacent the baffle. An upper C-clamp member 16 having grooved contact faces 16a is fitted onto the bolts and held in place by nuts 17. A central clamp base identical with bases 15 is threaded onto an eyebolt 19 whose end passes through a hole in the spacing member 10 centrally between the two baffles 11 and 12 and is fixed by a nut 20. A C-clamp member 21 identical with members 16 is slidable on the eyebolt and held fixed in position by a nut 22 threaded on eyebolt 19.

In use the neutral wire 23 of a three wire main is placed in one slot 18a of clamp base 18. A branch neutral wire 24 is placed in the other groove 18b of the clamp base 18. The C-clamp member 21 is brought down with the grooved contact faces 21a on each of the wires 23 and 24 and the nut 22 is tightened onto the C-clamp member. The other two wires 25 and 26 of the three wire main are placed one in each of the grooves 15c of clamps 15 and the branch wires 27 and 28 are placed in the opposite groove 15d of clamps 15. The C-clamp members 16 are then brought to bear with the grooved contact faces 16a on each of the wires of each pair and fixed there by the nuts 17. A wedge clamp 29 is fixed to the neutral branch wire 24 at a point spaced from its connection with the clamp 18. A bale wire 30 connects the wedge clamp 29 with the anchoring eyebolt 19 so as to leave the wires 24, 27 and 28 slack between wedge clamp 29 and clamps 15 and 18.

While I have illustrated and described a present preferred form of my invention in the foregoing description and drawings it will be understood that this invention may be otherwise embodied within the scope of the following claims.

I claim:

1. A mid-span take-off fixture comprising an elongated non-conductive spacing member, spaced non-conductive baffles intermediate the ends thereof, conductive clamp means permanently fixed to the spacing member and separated by said baffles, said clamp means conductively connecting a main conductor and a branch wire, anchor means on one of said clamp means, wire engaging means on the anchor means engaging a branch wire and maintaining constant wire slack between the clamp means and the wire engaging means.

2. A mid-span take-off fixture as claimed in claim 1 wherein the clamp means is an E-shaped base having two spaced wire receiving grooves and a C-shaped closure member having grooved ends cooperating with the grooves in the base conductively connecting a main conductor and a branch wire in side-by-side relationship.

3. A mid-span take-off fixture comprising an elongated non-conductive member, spaced conductive clamp means fixed along the length of said member, each said clamp means conductively connecting a main conductor and a branch wire, one of said clamp means including an anchor means for fastening and anchoring branch wires, and wire engaging means connected to said anchor means and to a branch wire maintaining constant wire slack between said anchor means and the connection of the wire engaging means on the branch wire.

References Cited in the file of this patent

UNITED STATES PATENTS

| | | |
|---|---|---|
| 1,852,031 | Steinmayer | Apr. 5, 1932 |
| 2,161,246 | Carlson | June 6, 1939 |
| 2,200,380 | Bodendieck | May 14, 1940 |
| 2,732,423 | Morrison | Jan. 24, 1956 |
| 2,868,861 | Bither | Jan. 13, 1959 |
| 2,887,524 | Fulps | May 19, 1959 |
| 2,929,861 | Husted | Mar. 22, 1960 |
| 2,979,555 | Bridges | Apr. 11, 1961 |

OTHER REFERENCES

Electrical World, pages 40–41, published June 8, 1959.

Electrical World, page 68, vol. 151, No. 19, published March 2, 1959.

Electrical World, page 70, published July 13, 1959.